United States Patent [19]

Inoue

[11] Patent Number: 5,625,009
[45] Date of Patent: Apr. 29, 1997

[54] ANTISTATIC POLYPHENYLENE ETHER RESIN COMPOSITION

[75] Inventor: Kazushige Inoue, Moka, Japan

[73] Assignee: General Electric Company, Pittsfield, Mass.

[21] Appl. No.: 340,095

[22] Filed: Nov. 15, 1994

[30] Foreign Application Priority Data

Nov. 15, 1993 [JP] Japan .................................. 5-307017

[51] Int. Cl.$^6$ .................................................. C08G 65/00
[52] U.S. Cl. ........................ 525/390; 525/391; 525/396
[58] Field of Search ................................... 528/529, 530, 528/534; 525/390, 391, 396

[56] References Cited

U.S. PATENT DOCUMENTS

| | | |
|---|---|---|
| 3,499,950 | 3/1970 | Weltzel et al. . |
| 5,273,685 | 12/1993 | Takata et al. . |
| 5,310,823 | 5/1994 | Kunitomi et al. . |

FOREIGN PATENT DOCUMENTS

0536483A1  4/1993  European Pat. Off. .

*Primary Examiner*—Jeffrey C. Mullis

[57] ABSTRACT

Antistatic polyethylene ether composition, containing (A) 100 parts, by weight, of a polyphenylene ether resin or such a resin and styrene resin containing at least one PPE resin in which at least 0.01 unit having at least one substituent of the following structure:

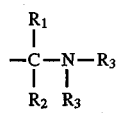

(where R1 and R2 independently represent a hydrogen atom, alkyl group, substituted alkyl group, halogen atom, aryl group, or substituted aryl group; R3 and R3' independently represent a hydrogen atom, alkyl group, or substituted alkyl group, but R3 and R3' are not simultaneously hydrogen atoms) is present per 100 phenylene ether structural units and (B) 3–30 parts, by weight, of poly(alkylene oxide) containing at least one poly(alkylene oxide) having at least one intramolecular structure selected from among the following structures:

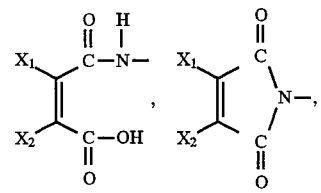

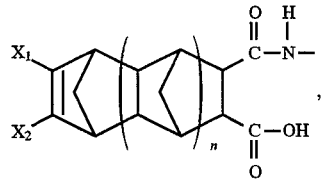

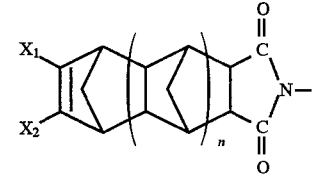

(where $X_1$ and $X_2$ independently represent a hydrogen atom, halogen atom, or alkyl group, and n is an integer ranging from 0 to 10).

11 Claims, No Drawings

ANTISTATIC POLYPHENYLENE ETHER RESIN COMPOSITION

FIELD OF THE INVENTION

The present invention concerns antistatic polyphenylene ether (occasionally, referred to as PPE hereinbelow) resin compositions.

DESCRIPTION OF RELATED ART

In addition to excellent heat resistance, polyphenylene ether resins have excellent mechanical strength, electrical properties, moisture resistance, flame retardancy, and other properties, and they have found various applications as resin molding materials. However, PPE resins have poor moldability as a result of their high melt viscosity, and they have other, fundamental drawbacks such as poor solvent resistance and impact resistance.

There are known in the art resin compositions such as NORYL (proprietary name; made by General Electric Co.) in which moldability and impact resistance are improved by blending PPE resin with styrene resin in order to overcome these drawbacks.

However, such compositions are electrical insulators and accumulate static electricity during use, causing dust to adhere to them and damaging their appearance. In addition, when they are used as cases, parts, or the like in electrical and electronic equipment, static interference can cause the devices to malfunction or fail.

In the prior art, antistatic agents have been kneaded into the compositions in order to overcome these problems. Anionic, cationic, nonionic, and other surfactants are used as antistatic agents. However, when these surfactants are blended into the resin, the appearance of moldings may be damaged by silver streaks or the like attributable to poor thermal stability. Furthermore, the antistatic effect of surfactants is not permanent and is easily lost by washing the moldings, friction, and the like.

Blending poly(alkylene oxide) into PPE has also been attempted (Unexamined Japanese Patent Application Disclosure Tokkai No. Sho 59-20354), but it is impractical because poly(alkylene oxide) shows poor compatibility with PPE and because using enough to manifest an antistatic effect leads to diminished strength, delamination, diminished impact resistance, and the like in the moldings. Obtaining a permanent antistatic effect by blending copolymers of poly(alkylene oxide) and polyamide with PPE has also been attempted (Tokkai Nos. Hei 4-246461 and Hei 4-202256). However, these copolymers are also insufficiently compatible with PPE, and using them in the amounts necessary to obtain an antistatic effect inevitably reduces the impact strength and weld strength of the moldings.

It is also known how to blend into the resin conductive fillers such as conductive carbon black, metal flakes, carbon fibers, or the like, but their use is limited for reasons of diminished formability, restrictions on coloring the resin material, and diminished appearance of the moldings.

Thus, the object of the present invention is to provide a polyphenylene ether resin composition having a permanent antistatic effect in which the various components are very compatible with one another.

SUMMARY OF THE INVENTION

The inventors discovered that compositions containing PPE resin having an amine-containing structural unit and poly(alkylene oxide) containing a specific structure have a permanent antistatic effect and good compatibility, thus arriving at the invention.

Thus, the present invention provides an antistatic polyethylene ether resin composition containing (A) 100 parts, by weight, of a polyphenylene ether resin or such a resin and styrene resin, containing at least one polyphenylene ether resin in which at least 0.01 unit having at least one substituent of the structure indicated in the following formula is present per 100 phenylene ether units

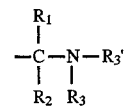

Formula 1

(where $R_1$ and $R_2$ independently represent a hydrogen atom, alkyl group, substituted alkyl group, halogen atom, aryl group, or substituted aryl group; $R_3$ and $R_3'$ independently represent a hydrogen atom, alkyl group, or substituted alkyl group, but $R_3$ and $R_3'$ are not simultaneously hydrogen atoms) and and (B) 3–30 parts, by weight, of poly(alkylene oxide) containing, intramolecularly, at least one structure selected from among those in the following formula

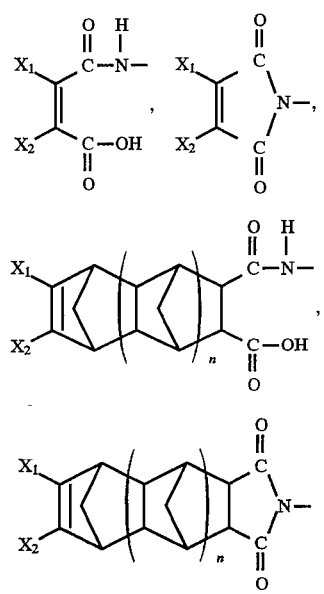

Formula 2

(where $X_1$ and $X_2$ independently represent a hydrogen atom, halogen atom, or alkyl group, and n is an integer ranging from 0 to 10).

DESCRIPTION OF THE PREFERRED EMBODIMENTS

PPE resin, which is also known as poly(phenylene oxide) resin, contains several phenylene ether units having the following formula

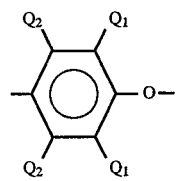

Formula 3

In this formula, each $Q_1$ is independently a hydrogen atom, halogen atom, a primary or secondary lower alkyl group (i.e., alkyl containing up to 7 carbon atoms), phenyl group, haloalkyl group, aminoalkyl group, hydrocarbonoxy group, or a halohydrocarbonoxy group having a structure in which at least two carbon atoms separate the halogen atom and oxygen atom, and each $Q_2$ is independently a hydrogen atom, halogen atom, primary or secondary lower alkyl group, phenyl group, haloalkyl group, hydrocarbonoxy group, or halohydrocarbonoxy group as defined for $Q_1$. Examples of suitable primary lower alkyl groups include methyl, ethyl, propyl, butyl, isobutyl, amyl, isoamyl, 2-methylbutyl, hexyl, 2,3-dimethylbutyl, 2-, 3-, or 4-methylpentyl, and corresponding heptyl groups. Examples of secondary lower alkyl groups include isopropyl, sec-butyl, and 3-pentyl groups. Straight-chain alkyl groups are preferred over branched. In many cases, each $Q_1$ is an alkyl or phenyl, especially a $C_{1-4}$ alkyl group, and each $Q_2$ is a hydrogen atom. Suitable PPEs have been disclosed in a large number of patents.

Both homopolymers and copolymers of PPE can be used in the present invention. Suitable homopolymers contain, for example, 2,6-dimethyl-1,4-phenylene ether units. Suitable copolymers comprise random copolymers containing 2,6-dimethyl-1,4-phenylene ether units in combination with, for example, 2,3,6-trimethyl-1,4-phenylene ether units. Many suitable random copolymers, as well as homopolymers, are disclosed in the patent literature.

PPE generally has a number average molecular weight ranging from approximately 3,000 to 40,000 and a weight average molecular weight ranging from approximately 20,000 to 80,000, as measured by gel filtration chromatography. Its intrinsic viscosity frequently ranges from approximately 0.15 to 0.6 dL/g, preferably from 0.25 to 0.55 dL/g, as measured in chloroform at 25° C.

At least a portion of the above-described PPE resin used in the invention must have an amine-containing structural unit (i.e., must be modified PPE resin). What is meant by a PPE resin with an amine-containing structural unit is a resin having phenylene ether structural units (the above-described (Formula 5)) which contain at least one substituent with the structure shown in the above (Formula 3) at the $Q_1$ or $Q_2$ position in proportions of at least 0.01 unit, preferably 0.05 unit, for every 100 phenylene ether structural units. If there are less than 0.01 such units, there are too few bonds with the polyalkylene oxide, and a composition with the desired properties is difficult to obtain. It is especially preferred that the unit having a substituent with the structure described by the above-mentioned (Formula 1) be an end group. In this case, it is preferred that the substituent having the structure in the above-described (Formula 1) be in the position adjacent to the hydroxy group, i.e., $Q_1$.

$R_1$ and $R_2$ in the above-described (Formula 3) may represent alkyl groups, for example lower alkyl groups such as methyl, ethyl, propyl, and butyl groups; substituted alkyl groups, wherein examples of the substituents include halogen atoms, i.e., F, Cl, Br, or I; aryl groups such as phenyl and naphthyl groups; and substituted aryl groups, wherein examples of the substituents include lower alkyl groups, halogen atoms, and nitro groups. Examples of $R_3$ and $R_3'$ include alkyl groups and substituted alkyl groups defined as above.

Preferred among the above-described structures are $R_1=R_2=H$ and $R_3=R_3'=$butyl.

When a copper- or manganese-containing catalyst is used, PPE having this type of specific structural unit can be obtained by blending an appropriate primary or secondary monoamine as a component of the oxidative coupling reaction mixture. Such amines, especially the dialkylamines and preferably dibutylamine and dimethylamine, frequently become chemically bonded to PPE, which is often achieved by substituting at least one α-hydrogen atom in one or more of the $Q_1$ groups. The main site for this reaction is the $Q_1$ group adjacent to the hydroxy group on the terminal unit of the polymer chain. This type of manufacturing method for PPE is described in detail in *Macromolecules*, vol. 23, pp. 1318–1329 (1990).

As mentioned hereinabove, component (A) can contain unmodified PPE in addition to modified PPE. It is preferred for unmodified PPE to amount to no more than 50 percent, by weight, of the entire amount of PPE.

Optionally, component (A) can also contain styrene resin. Styrene resin is itself known in the art. The polymer must contain at least 25 percent, by weight, of a repeating unit derived from an aromatic vinyl compound described by the general formula

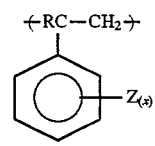

Formula 4

(where R is a hydrogen atom or an alkyl group with from 1 to 4 carbon atoms; Z represents a halogen atom or a substituent which is an alkyl group with from 1 to 4 carbon atoms; and x is an integer ranging from 0 to 5.) Examples of such styrene polymers include homopolymers of styrene or its derivatives (for example, p-methylstyrene, α-methylstyrene, α-methyl-p-methylstyrene, chlorostyrene, and bromostyrene); styrene copolymers mixed or modified with elastomeric substances such as polybutadiene, polyisoprene, butyl rubber, EPDM, ethylene-propylene copolymers, and natural rubber; and styrene-containing copolymers such as styrene-acrylonitrile copolymer (SAN), styrene-butadiene copolymer, and styrene-acrylonitrile-butadiene copolymer (ABS). The styrene resins preferred for the invention are homopolystyrene and rubber-reinforced polystyrene (HIPS). Styrene resin can be used in amounts of up to 90 percent, by weight, of the entire amount of component (A).

Poly(alkylene oxide) is a polymer described by the following general formula (Formula 5)

(where each $R_a$ and $R_b$ is independently a bivalent hydrocarbon group such as a straight-chain or branched alkylene group, and m is art integer ranging from 10 to 10,000). In the present invention, the molecule of this type of polymer must contain at least one modified poly(alkylene oxide) having at least one structure selected from among those in above-described (Formula 2) as component (B). As a substituent of $R_a$ or $R_b$, the structure selected from those in (Formula 2) may be present as a mid-chain or terminal group, preferably as a terminal group.

$X_1$ and $X_2$ in (Formula 2) may be halogens, i.e., F, Cl, Br, or I, or alkyl groups, for example straight-chain or branched lower alkyl groups such as methyl, ethyl, propyl, or butyl groups.

Poly(alkylene oxide) having such a structure can be manufactured by, for example, adding one, two, or more compounds selected from compounds described by the following formula

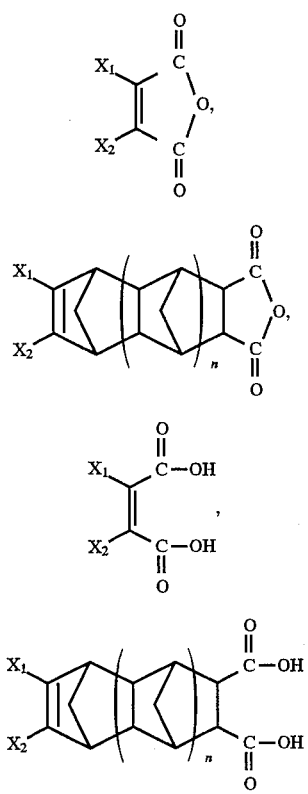

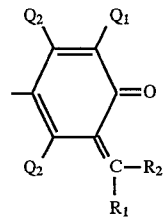

Formula 6

Formula 7

(where $X_1$, $X_2$, and n are defined as above) to poly(alkylene oxide) having at least one intramolecular amine group and then cyclodehydrating as desired. The addition reaction for the above-described amine and compound in (Formula 6) can be carried out by a conventional method. For example, the ingredients can be reacted in a solvent such as acetone or ether with refluxing. The cyclodehydration (imine production) can be performed by a conventional method, using acetic anhydride. Preferred examples of the compound described by (Formula 6), hereinabove, include maleic acid, fumaric acid, nadic acid, itaconic acid, maleic anhydride, nadic anhydride, and itaconic anhydride.

As mentioned hereinabove, component (B) can contain unmodified poly(alkylene oxide) in addition to modified polyalkylene oxide. No more than 50 percent, by weight, of unmodified poly(alkylene oxide), based on the entire weight of component (B), is preferred.

In the present invention, from 3 to 30 parts, preferably from 5 to 25 parts, of component (B) per 100 parts, by weight, of component (A) are blended into the composition. If less than 3 parts, by weight, of (B) are used, a sufficient antistatic effect cannot be obtained, and if more than 30 parts, by weight, are used, the mechanical strength and heat resistance of the moldings may be compromised.

The resin composition of the invention can be manufactured by heating the above-described components to a temperature above the glass transition temperature (Tg) of the PPE used, preferably without a solvent. The heating method is not particularly restricted, but it is preferred that the two components be melted and kneaded using a Laboplast mill, Banbury mixer, kneader, single-screw extruder, twin-screw extruder, or the like.

A case in which the amine-containing structural unit in the PPE resin is at the end of the molecule will be discussed to illustrate the reaction mechanism in the method of the invention. When PPE resin is heated to a temperature above its glass transition temperature, amine from the amine-containing structures in the resin splits off, forming a reaction intermediate such as is described by the following formula (where $Q_1$, $Q_2$, $R_1$, and $R_2$ are defined as above.) It is assumed that a bond is formed in a Diels-Alder reaction between this [reaction intermediate] and the carbon-carbon double bond in the structure selected from among those in the above-described (Formula 2), which itself is bound to the poly(alkylene oxide). Not all of the amine in the PPE and the above-described structures of the poly(alkylene oxide) are completely reacted, with unreacted residues of each component remaining. Accordingly, the unreacted components are copresent with the reaction product of bound PPE and poly(alkylene oxide) in the resin composition of the invention. Nonetheless, the permanent antistatic effect of the composition of the invention, unlike a simple blend of these ingredients, is ascribed to the fact that the poly(alkylene oxide) is fixed by such a reaction.

EXAMPLES

Working Examples 1 and 2

(1) Manufacture of PPE Resin Having an Amine-Containing Structure

Dibutylamine and 2,6-xylenol were oxidatively coupled by a conventional method to obtain poly(2,6-dimethyl-1,4-phenylene) ether (weight average molecular weight 64,000, number average molecular weight 22,000). An $H^1$-NMR assay for $\phi$-$CH_2$-$NR_2$ (where $\phi$ is a phenyl group, and R is a butyl group) revealed that this PPE contained 0.83 percent, by weight, of dibutylamine residue. The results of DSC showed that the glass transition temperature of this PPE was 207° C.

(2) Manufacture of Modified Poly(alkylene oxide)

Poly(ethylene oxide) containing amino groups at both ends (number average molecular weight 1000) and an equivalent of maleic anhydride were reacted in acetone at ordinary temperature to obtain modified poly(ethylene oxide) (referred to as modified PEO hereinbelow) with added maleic anhydride. The structure was confirmed by NMR and IR.

(3) Manufacture of the Resin Composition

The PPE having an amine-containing structure manufactured in (1), hereinabove, the modified PEO manufactured in (2), hereinabove, and homopolystyrene (Dick Styrene CR-3500, made by Dainippon Inki Kagaku Kogyo K.K.) were blended in the proportions shown by weight in Table 1 and then melt-kneaded at 300° C. for 10 min, using a Laboplast mill.

The melt kneaded composition was hot-pressed to obtain sheets, 2 mm thick. The sheets were evaluated in the following manner. The results are shown in Table 1.

(1) Surface Resistivity

Surface resistivity was measured in flat injection molded pieces (50 mm×50 mm×3 mm). Some pieces were measured after conditioning at room temperature and a relative humidity of 50 percent. Other pieces were measured after washing in water (distilled water for 3 min in an ultrasonic washer), thoroughly removing the moisture, and then conditioning the pieces for 1 hr in 50 percent relative humidity at room temperature.

(2) Charge Half Time

The half time of a charge obtained by applying 6 KV for 1 min was measured with a static honestometer. As in (1), the surface resistivity measurement, the charge half time was measured after molding and after washing.

Comparative Examples 1–2

Compositions were melt-kneaded and then hot-pressed into sheets, 2 mm thick, in the same manner as in Working Examples 1 and 2, except that unmodified poly(ethylene oxide) (number average molecular weight 1000, referred to as unmodified PEO) was used instead of the modified PEO manufactured in (2) of Working Examples 1 and 2. The sheets were evaluated in the same manner as in Working Examples 1 and 2. These results are also shown in Table 1.

TABLE 1

| Component (Parts by Weight) | Working Examples | | Comparative Examples | |
|---|---|---|---|---|
| | 1 | 2 | 1 | 2 |
| (A) Modified PPE | 40 | 40 | 40 | 40 |
| Polystyrene | 60 | 60 | 60 | 60 |
| (B) Modified PEO | 5 | 10 | — | — |
| Unmodified PEO | — | — | 5 | .10 |
| Evaluative Test After Molding | | | | |
| Surface resistivity ($\Omega$) | $10^{12}$ | $10^{11}$ | $10^{12}$ | $10^{11}$ |
| Charge half time (sec) | $\leqq$3 sec | $\leqq$3 sec | $\leqq$3 sec | $\leqq$3 sec |
| After Washing | | | | |
| Surface resistivity ($\Omega$) | $10^{12}$ | $10^{11}$ | $10^{14}$ at least | $10^{14}$ at least |
| Charge half time (sec) | $\leqq$3 sec | $\leqq$3 sec | No reduction | No reduction |

The composition of the invention shows a permanent antistatic effect, and as a result is extremely useful, being applicable in various fields.

I claim:

1. A composition comprising:
   (A) 100 parts, by weight, of a polyphenylene ether resin or such a resin and styrene resin, containing at least one polyphenylene ether resin in which at least 0.01 unit having at least one substituent of the formula

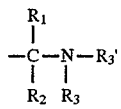

is present per 100 phenylene ether units, wherein $R_1$ and $R_2$ independently represent a hydrogen atom, alkyl group, halogen atom, or aryl group; $R_3$ and $R_3'$ independently represent a hydrogen atom, alkyl group, or substituted alkyl group, but $R_3$ and $R_3'$ are not simultaneously hydrogen atoms; and
   (B) 3–30 parts, by weight, of poly(alkylene oxide) containing, intramolecularly, at least one structure selected from the group consisting of:

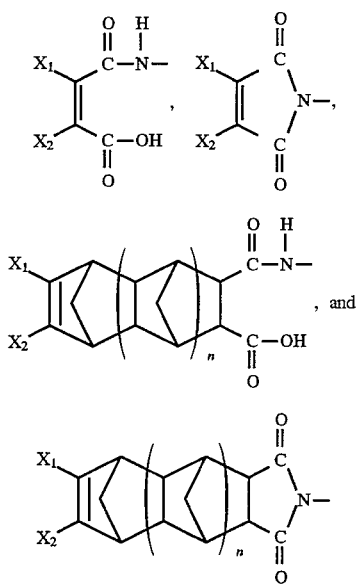

wherein $X_1$ and $X_2$ independently represent a hydrogen atom, halogen atom, or alkyl group, and n is an integer ranging from 0 to 10.

2. A composition as recited in claim 1 wherein the poly(alkylene oxide) is present in an amount of 5 to 25 parts by weight.

3. A composition as recited in claim 1 wherein the polyphenylene ether resin or such a resin and styrene resin, contains at least one polyphenylene ether resin in which at least 0.05 unit having at least one substituent of the formula:

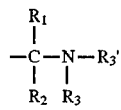

is present per 100 phenylene ether units.

4. A composition as recited in claim 3 wherein the poly(alkylene oxide) is present in an amount of 5 to 25 parts by weight.

5. The composition of claim 1 further comprising an unmodified poly(alkylene oxide) in an amount of no more the 50% by weight of component (B).

6. A composition comprising a reaction product from the composition of claim 1.

7. The composition of claim 1 wherein the composition has a charge half time of less than 5 seconds after applying a 6 KV charge for 1 minute.

8. The composition of claim 7 wherein the charge half time is less than or equal to 3 seconds.

9. The composition of claim 7 wherein the charge half time is less than or equal to 3 seconds after washing in distilled water for 3 minutes in an ultrasonic washer.

10. The composition of claim 1 wherein the styrene resin is selected from the group consisting of homopolystyrene, rubber-reinforced polystyrene, styrene-acrylonitrile copolymer, styrene-butadiene copolymer, and styrene-acrylonitrile-butadiene copolymer.

11. A composition consisting essentially of:
   (A) 100 parts, by weight, of a polyphenylene ether resin or such a resin and styrene resin, containing at least one polyphenylene ether resin in which at least 0.01 unit having at least one substituent of the formula

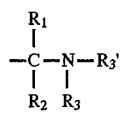

is present per 100 phenylene ether units, whereto $R_1$ and $R_2$ independently represent a hydrogen atom, alkyl group, halogen atom, or aryl group; $R_3$ and $R_3'$ independently represent a hydrogen atom, alkyl group, or substituted alkyl group, but $R_3$ and $R_3'$ are not simultaneously hydrogen atoms; and (B) 3–30 parts, by weight, of poly(alkylene oxide) containing, intramolecularly, at least one structure selected from the group consisting of:

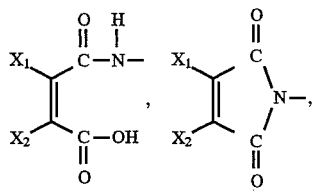

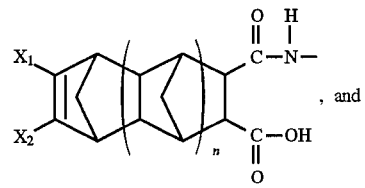

, and

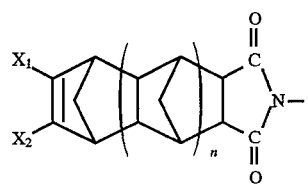

wherein $X_1$ and $X_2$ independently represent a hydrogen atom, halogen atom, or alkyl group, and n is an integer ranging from 0 to 10.

* * * * *